United States Patent Office 3,507,872
Patented Apr. 21, 1970

3,507,872
INDOLYL-QUINOLINIUM DYESTUFFS
Gert Hegar, Basel, Switzerland, assignor to Ciba Limited, Basel, Switzerland, a company of Switzerland
No Drawing. Filed July 19, 1966, Ser. No. 566,206
Claims priority, application Switzerland, June 7, 1966, 8,198/66; Aug. 11, 1965, 71,294/65
Int. Cl. C07d 33/50, 57/04; C09b 15/00
U.S. Cl. 260—286                                    10 Claims

ABSTRACT OF THE DISCLOSURE

Water soluble basic dyestuffs for dyeing especially polyacrylonitrile fibres and corresponding to the general formula (A—B)+X− in which A is a quinolinium radical bound via its α- or γ-position, B is an indole radical bound via its 3-position and X is an anion.

---

German Patent No. 269,894, patented Jan. 4, 1913 to Farbenfabriken vorm. Friedr. Bayer & Co., Leverkusen, Germany, discloses a process for the manufacture of basic water-soluble dyestuffs by the condensation of α-pyridones with secondary or tertiary aromatic amines in the presence of dehydrating agents. However, these known dyestuffs produce dyeings of poor fastness to light on polyacrylonitrile fibres.

The present invention is based on the observation that fast-to-light basic dyestuffs of the general formula

[A—B]+X− in which A represents a pyridinium residue which may also contain one or more fused aryl residues and which is bound to B in α-position or γ-position, and B represents an indole residue bound to A in 3-position, and X represents an anion, are obtainable by condensing an α- or a γ-pyridone, which may contain one or more fused benzene rings, with an indole unsubstituted in 3-position and, if necessary, treating the condensation product so obtained with a quaternating agent.

It is preferable to use an α-pyridone of the general formula

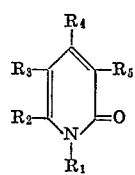

or a γ-pyridone of the general formula

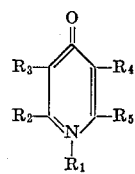

in which formulae $R_1$ represents an alkyl group, $R_2$, $R_3$, $R_4$ and $R_5$ each represents a hydrogen atom or an alkyl, an aralkyl or an aryl group, it being possible for two R groups in ortho-position to form an aromatic ring system together with the vicinal carbon atoms of the pyridone rings. The following compounds may be mentioned as examples:

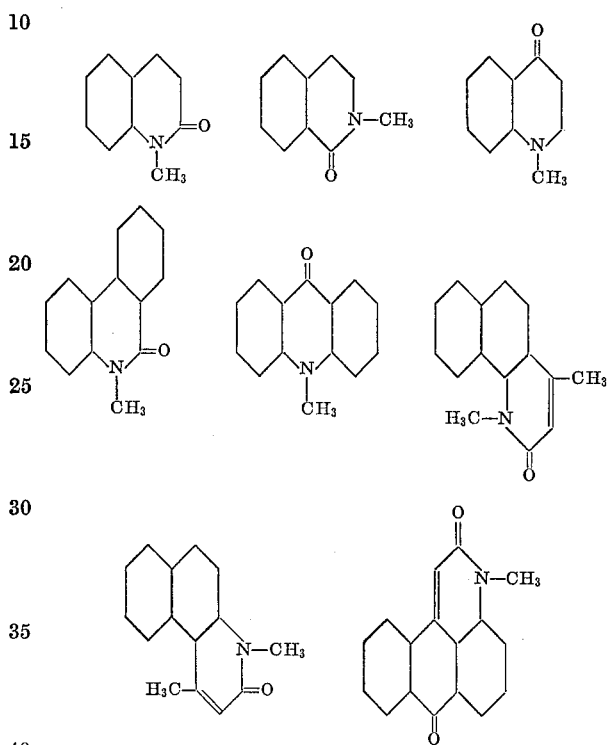

These starting materials are known compounds which are obtainable by known processes.

The indoles used are, especially, those of the formula

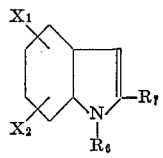

in which $R_6$ represents a hydrogen atom or an alkyl group, $R_7$ represents an alkyl, alkoxy or aryl group and $X_1$ and $X_2$ each represents a hydrogen atom or a halogen atom or an alkyl group or alkoxy group, and in which the groups $X_1$ and $X_2$ may also form a fused benzene ring.

As examples there may be mentioned: 2-methylindole, 1,2-dimethylindole, 2,5-dimethylindole, 2-methyl-5-methoxyindole, 2-methyl-5-ethoxyindole, 2-methyl-5- or -6-chloroindole, 2-methyl-7-chloroindole, 2-methyl-5, 7-dichloroindole, 2-methoxyindole, 2-ethoxyindole, 2-phenylindole, 1-methyl-2-phenylindole, 1-methyl-2-phenyl-5-chloroindole and 1-methyl-2-phenyl-5-methoxyindole.

Thus the invention also provides water-soluble dyestuffs of the formula

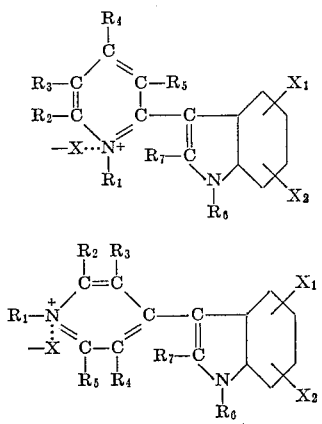

in which X, $R_1$, $R_2$, $R_3$, $R_4$ and $R_5$ as defined above, it being possible for two R groups in the ortho-position to form an aromatic ring system together with the vicinal carbon atoms of the pyridone ring, and $R_6$, $R_7$, $X_1$ and $X_2$ are also as defined above or of the general formula

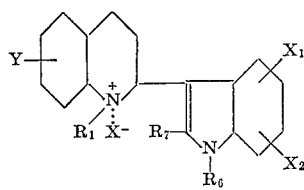

in which $R_1$, $R_6$, $R_7$, X, $X_1$ and $X_2$ have the meanings given above and Y represents a hydrogen or halogen atom or an alkyl or alkoxy group.

The condensation is advantageously carried out at an elevated temperature in an inert organic solvent, for example, benzene, toluene, chloroform, carbon tetrachloride, ethylene chloride, chlorobenzene, ortho-dichlorobenzene, dioxan or nitrobenzene, advantageously in the presence of a dehydrating agent. The most suitable substances to be used as dehydrating agents are acid chlorides, for example, phosphorus oxychloride, phosphorus trichloride, phosphorus pentachloride, thionyl chloride, sulphuryl chloride and phosgene or mixtures thereof. It is often advantageous to add a Friedel-Crafs catalyst, for example, aluminum chloride, zinc chloride, tin(IV) chloride, iron(III) chloride or borontrifluoride. In general, the reaction is carried out at a temperature within the range of from 20° C. to 150° C., preferably at a temperature within the range of from 60° C. to 130° C.

When using, as starting materials, a pyridone in which the imino group is unsubstituted, the condensation product obtained must be treated with a quaternating agent. Suitable quaternating agents are alkyl or aralkyl halides, alkyl or aralkyl esters of sulphuric acid or organic sulphonic acids, for example, methyl chloride, methyl bromide, methyl iodide, benzyl chloride, dimethyl sulphate, diethyl sulphate, benzenesulphonic acid methyl esters or para-toluene sulphonic acid ethyl butyl esters.

Quaternation is advantageously carried out in one of the above-mentioned inert organic solvents or in a large excess of an alkylating agent. In this case, care must be taken to ensure that the mixture is not heated excessively because the reaction is strongly exothermic. In most cases, however, it is nevertheless necessary to apply external heat to the reaction mixture, in order to start the reaction, especially when in the presence of organic solvents.

In some cases it is advantageous to use an excess of the quaternating agent in order to obtain good yields.

When using an inert organic solvent, the dyestuff salt precipitates during the reaction and can be isolated by filtration. The solvent can be removed by distillation, for example, in vacuo or with steam.

Purification of the dyestuff salt is advantageously effected by dissolution in water and then any unreacted starting material can be filtered off as an insoluble residue. The dyestuff can again be precipitated from the aqueous solution by the addition of a water-soluble salt, for example, sodium chloride.

The quaternated dyestuffs preferably contain as the anion the residue of a strong acid, for example, sulphuric acid or the semi-esters thereof, or the residue of an arylsulphonic acid or a halogen ion. The said anions, which are introduced into the dyestuff molecule in accordance with the invention, may be replaced by anions of other inorganic acids, for example, phosphoric acid or by the anions of organic acids e.g. formic acid, acetic acid, chloroacetic acid, oxalic acid, lactic acid or tartaric acid. In certain cases it is also possible to use the free bases. The dyestuff salts can also be used in the form of double salts, for example, with halides of Group II of the Periodic Table, especially zinc chloride or cadmium chloride.

The dyestuffs obtainable by the process of the invention are suitable for dyeing a very wide variety of materials, for example, tannin-treated cellulosic fibres, silk, hairs and synthetic fibers, especially polyacrylonitrile, and synthetic fibers made from asymmetric dicyanoethylene. The dyestuffs are also suitable for dyeing modified polyester fibres which contain acid groups. Dyeings produced on these fibres display a good fastness to light, even when the dyestuffs are applied in conjunction with other basic dyestuffs.

The following examples illustrate the invention. Unless otherwise stated, the parts and percentages are by weight.

Example 1

20 grams of phosphorus oxychloride are added dropwise at 90° C. to a mixture comprising 15.9 parts of 1-methylquinolone-(2), 13.1 parts of 2-methylindole and 200 parts of anhydrous chlorobenzene. The mixture is stirred for 4 to 5 hours at 90° C. to 95° C. When cold, it is stirred into water and the chlorobenzene is removed by steam distillation. Sodium bromide is added to the clear yellow solution that remains to precipitate the dyestuff.

The dyestuff corresponds to the formula

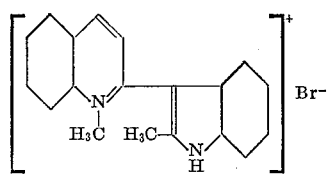

and dyes fibres made from polyacrylonitrile (or polyvinylidine-cyanide) strong yellow tints having a very good fastness to light.

Dyestuffs yeilding the tints listed in Column IV of the following Table are obtainable in an analogous manner from the quinolone components listed in Column II and the indole components listed in Column III.

| I No. | II Quinolone component | III Indole component | IV Tint | V Anion |
|---|---|---|---|---|
| 1 | 1-methylquinolone-(2) | 1,2-dimethylindole | Yellow | Cl- |
| 2 | do | 2-phenylindole | do | Cl- |
| 3 | do | 2-methyl-5-chlorindole | do | Br- |
| 4 | do | Indole | do | Cl- |
| 5 | 1,4-dimethylquinolone-(2) | do | do | HCOO- |
| 6 | do | 2-methylindole | do | Br- |
| 7 | do | 1,2-dimethylindole | do | Cl- |
| 8 | 2-methylisoquinolone-(1) | 2-methylindole | do | ZnCl3- |
| 9 | do | 2-phenylindole | do | Cl- |
| 10 | 6-chloro-1,4-dimethylquinolone-(2) | 2-methylindole | do | I- |
| 11 | do | Indole | do | I- |
| 12 | 7-chloro-1,4-dimethylquinolone-(2) | do | do | HCOO- |
| 13 | do | 2-phenylindole | do | Cl- |
| 14 | 1-ethylquinolone-(2) | 2-methyl-5-chloroindole | do | Cl- |
| 15 | do | 2-methylindole | do | Br- |
| 16 | 5,6-benzo-1,4-dimethylquinolone-(2). | do | Orange | Cl- |
| 17 | 5,6-benzo-1-ethyl-4-methyl-quinolone-(2). | 2-phenylindole | do | Cl- |

EXAMPLE 2

14.5 parts of carbostyril (2-hydroxyquinoline) are introduced into 70 parts of phosphorus oxychloride and the batch is heated for a short period of time until dissolution is complete. 13.1 parts of 2-methylindole are then added and stirring is continued for 3 hours at 90 to 95° C. After cooling the reaction mixture, it is diluted with 100 parts of anhydrous benzene, the dyestuff magma is isolated by filtration and the excess phosphorus oxychloride is washed out with anhydrous benzene. The dyestuff salt so obtained gives a clear, yellow solution in water and dyes polyacrylonitrile fibres fast yellow tints when applied in a slightly acid bath.

When the dyestuff salt is dissolved in water and the solution is rendered alkaline by the addition of aqueous ammonia solution, the colourless dyestuff base of the formula

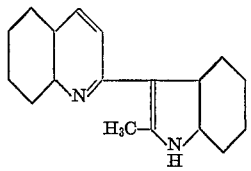

is obtained which is sparingly soluble in water.

2.58 parts of the dyestuff base, 50 parts of anhydrous chlorobenzene and 2 parts of para-toluenesulphonic acid methyl ester are stirred together for 5 hours at 120° C. and the dyestuff which precipitates when the batch is cool is isolated by filtration and dried. Its cation portion is identical with that of the dyestuff described in Example 1 and it dyes polyacrylonitrile fibres yellow tints possessing a very good fastness to light.

Dyestuffs having similar dyeing properties are obtained when the para-toluenesulphonic acid methyl ester used as quaternating agent is replaced by the corresponding ethyl ester, butyl ester, dimethyl sulphate, diethyl sulphate or benzyl chloride.

Further yellow dyestuffs having good properties of fastness are obtainable in an analogous manner by condensing the compounds listed in Column II of the following Table with the indole components listed in Column III and, if necessary, quaternating with the quaternating agents listed in Column IV.

| I No. | II Quinolone component | III Indole component | IV Quaternating agent |
|---|---|---|---|
| 1 | 2-methylquinolone-(4) | Indole | |
| 2 | do | 2-methylindole | Dimethyl sulphate. |
| 3 | do | do | Benzyl chloride. |
| 4 | do | 1,2-dimethylindole | Diethyl sulphate. |
| 5 | 6-chloro-4-methyl-quinolone-(2). | 2-methylindole | Do. |
| 6 | do | 2-methyl-5-chloro-indole. | Para-toluenesulphonic acid ethyl ester. |
| 7 | 4-methylquinolone-(2) | 2-phenylindole | Dimethyl sulphate. |
| 8 | do | 2-methylindole | Benzyl chloride. |
| 9 | do | 1,2-dimethylindole | |
| 10 | Carbostyril | 2-phenylindole | Dimethyl sulphate. |
| 11 | do | 2,5-dimethylindole | Methyliodide. |
| 12 | do | 2-methyl-5-methoxy-indole. | Benzyl chloride. |
| 13 | do | Indole | Do. |
| 14 | do | 2-methyl-5-ethoxyindole | |
| 15 | do | do | Para-toluenesulphonic acid butyl ester. |
| 16 | do | 1-methyl-2-phenyl-indole. | Dimethyl sulphate. |

EXAMPLE 3

2.09 parts of N-methylphenanthridone and 25 parts of phosphorus oxychloride are stirred together until a clear solution forms. 1.31 parts of 2-methylindole are added and the reaction mixture is heated for 3 hours at 90° C., during which process it acquires a deep yellow colour. After cooling the reaction mixture it is poured into water, the batch is stirred until the excess phosphorus oxychloride is completely decomposed, the dyestuff is precipitated from the yellow aqueous solution by the addition of sodium iodide, isolated by filtration and dried. It dyes polyacrylonitrile fibres fast-to-light yellow tints.

Dyestuffs having similar dyeing properties are obtained by using indole, 1,2-dimethylindole, 2,5-dimethylindole or 2-phenyl-5-chloroindole instead of 2-methylindole.

EXAMPLE 4

The same procedure is adopted as in Example 3, except that N-methylacridone is used instead of N-methylphenanthridone. The dyestuff obtained dyes polyacrylonitrile fibres fast-to-light red tints.

The same dyestuff is obtainable by first condensing acridone with 2-methylindole as in Example 2, and then treating the dyestuff base so obtained with a methylating agent, for example, dimethyl sulphate, methyliodide or para-toluene-sulphonic acid methyl ester.

Dyeing prescription 1 part of the dyestuff obtained in the manner described in Example 1 is dissolved in 5,000 parts of water in the presence of 2 parts of 40% acetic acid. 100 parts of dried yarn made from polyacrylonitrile staple fibres are entered into this dyebath at 60° C., the temperature is raised to 100° C. during half an hour and dyeing is continued for one hour at the boil. The yarn is then well rinsed and dried. A yellow dyeing possessing a very good fastness to light, to sublimation and to washing is obtained.

What is claimed is:
1. A water-soluble dyestuff selected from compounds consisting of

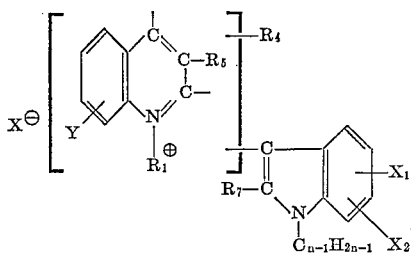

and

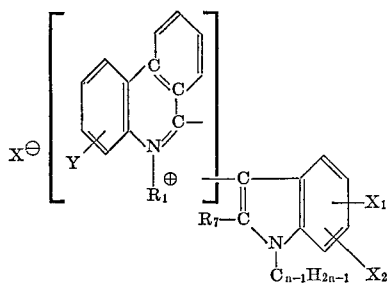

in which X is an anion of an acid selected from the group consisting of a strong inorganic acid, a sulfuric acid semi-ester, a carboxylic acid or a sulfonic acid; $R_1$ is selected from the group consisting of methyl and ethyl; Y is selected from the group consisting of hydrogen, halo, methyl, ethyl, methoxy and ethoxy; each of $R_4$ and $R_5$ is selected from the group consisting of methyl, ethyl and hydrogen; each of $X_1$ and $X_2$ is selected from the group consisting of hydrogen, halo, methyl, ethyl, methoxy and ethoxy; $R_7$ is selected from the group consisting of hydrogen, phenyl, lower alkyl and lower alkoxy, and $n$ is a whole positive number up to 3.

2. The water-soluble dyestuff as claimed in claim 1 which corresponds to the formula

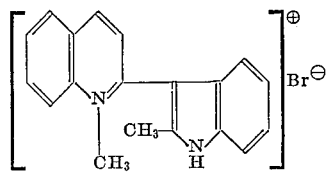

3. The water-soluble dyestuff as claimed in claim 2 which corresponds to the formula

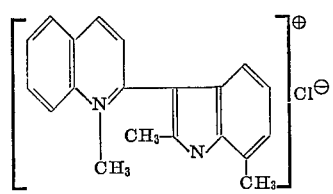

4. The water-soluble dyestuff as claimed in claim 1 which corresponds to the formula

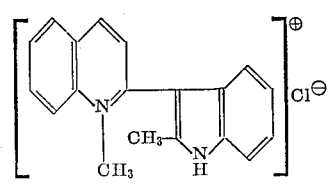

5. The water-soluble dyestuff as claimed in claim 1 which corresponds to the formula

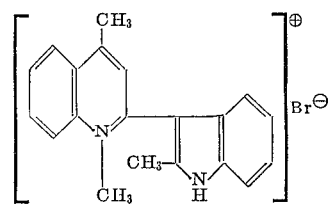

6. The water-soluble dyestuff as claimed in claim 1 which corresponds to the formula

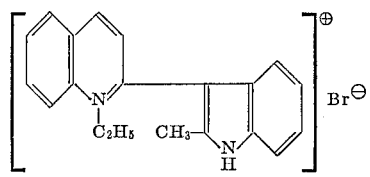

7. The water-soluble dyestuff as claimed in claim 1 which corresponds to the formula

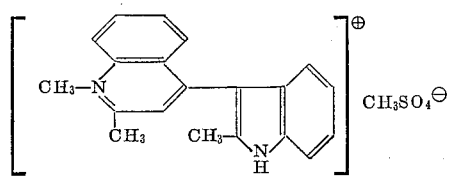

8. The water-soluble dyestuff as claimed in claim 1 which corresponds to the formula

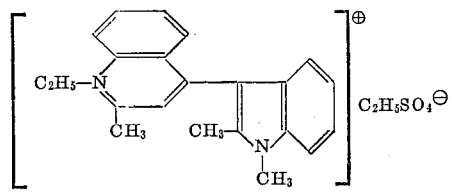

9. The water-soluble dyestuff as claimed in claim 1 which corresponds to the formula

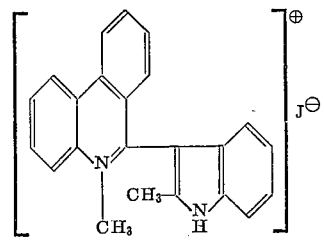

10. The water-soluble dyestuff as claimed in claim 1 which corresponds to the formula

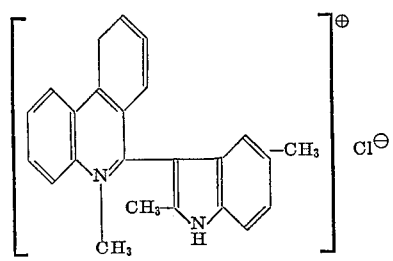

(References on following page)

References Cited

UNITED STATES PATENTS

| | | |
|---|---|---|
| 2,652,396 | 9/1953 | Keyes et al. _____ 260—286 X |
| 3,149,105 | 9/1964 | Larive et al. _____ 260—286 X |
| 3,245,874 | 4/1966 | Seto et al. _____ 260—286 X |
| 3,326,919 | 6/1967 | Wakeman et al. _____ 260—286 |
| 3,326,923 | 6/1967 | Shavel et al. _____ 20—286 X |
| 3,331,849 | 7/1967 | Shavel et al. _____ 260—286 |
| 3,340,265 | 9/1967 | Wakeman et al. _____ 260—286 |
| 3,370,063 | 2/1968 | Suh _____ 260—288 X |

DONALD G. DAUS, Primary Examiner

U.S. Cl. X.R.

8—55; 260—279, 289, 297, 278, 326.16, 296, 319.1

CASE 5755/E

PO-1050
(5/69)

UNITED STATES PATENT OFFICE
CERTIFICATE OF CORRECTION

Patent No. 3,507,872                    Dated April 21, 1970

Inventor(s) GERT HEGAR

It is certified that error appears in the above-identified patent and that said Letters Patent are hereby corrected as shown below:

Column 7, line 55, delete "2" and insert --- 1 ---.

Column 7, lines 60-65, amend the right hand side of the formula to read:

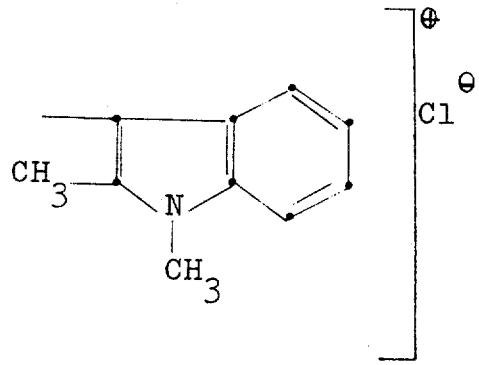

Signed and sealed this 25th day of May 1971.

(SEAL)
Attest:

EDWARD M. FLETCHER, JR.
Attesting Officer

WILLIAM E. SCHUYLER, JR.
Commissioner of Patents